Feb. 11, 1930. J. GOGAN 1,746,891
APPARATUS FOR TESTING MATERIALS
Filed Feb. 28, 1927 4 Sheets-Sheet 1

Inventor.
Joseph Gogan
by Kwis Hudson & Kent Attorneys

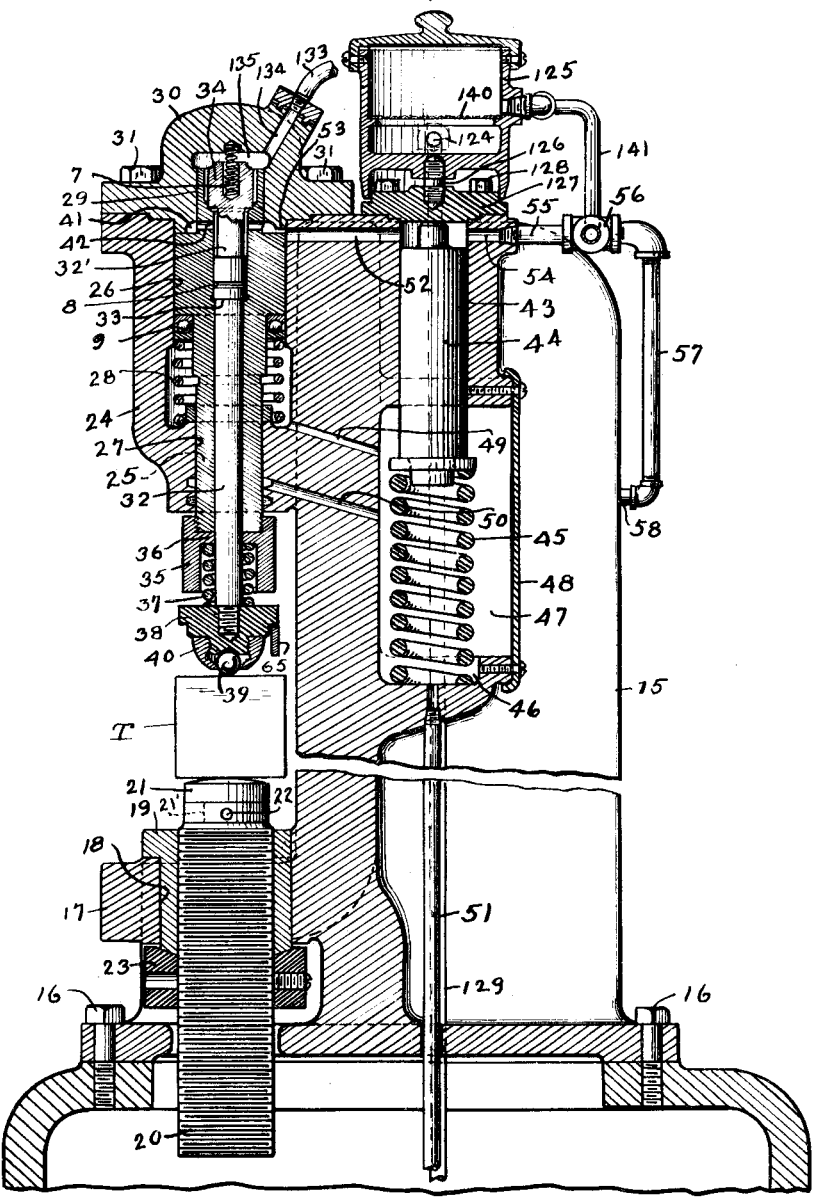

Feb. 11, 1930.  J. GOGAN  1,746,891
APPARATUS FOR TESTING MATERIALS
Filed Feb. 28, 1927  4 Sheets-Sheet 3
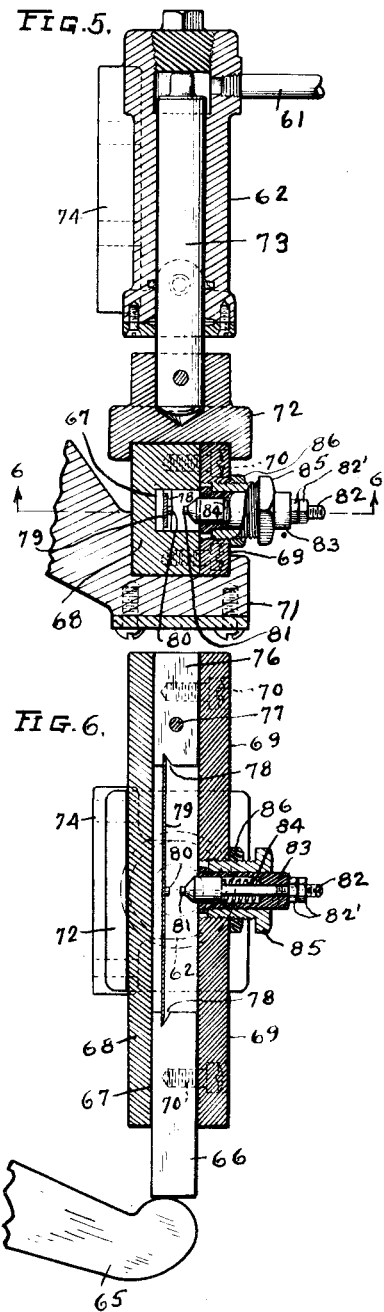
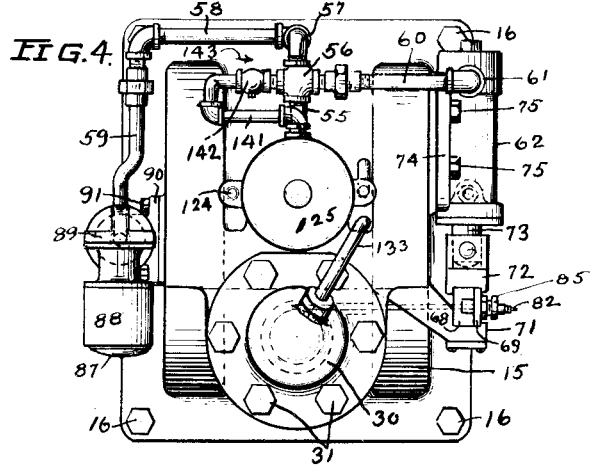
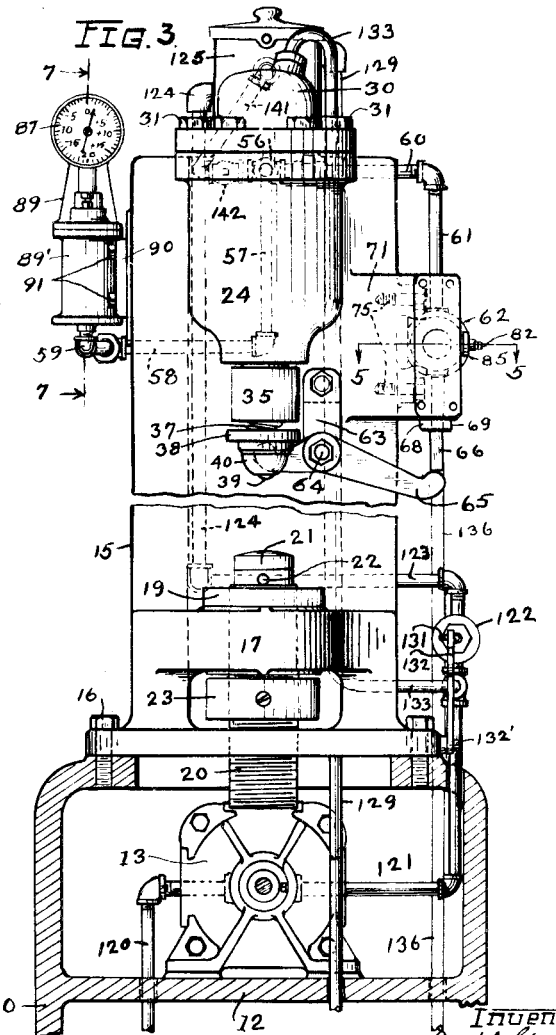
Inventor
Joseph Gogan
by Kwis Hudson & Kent Attorneys

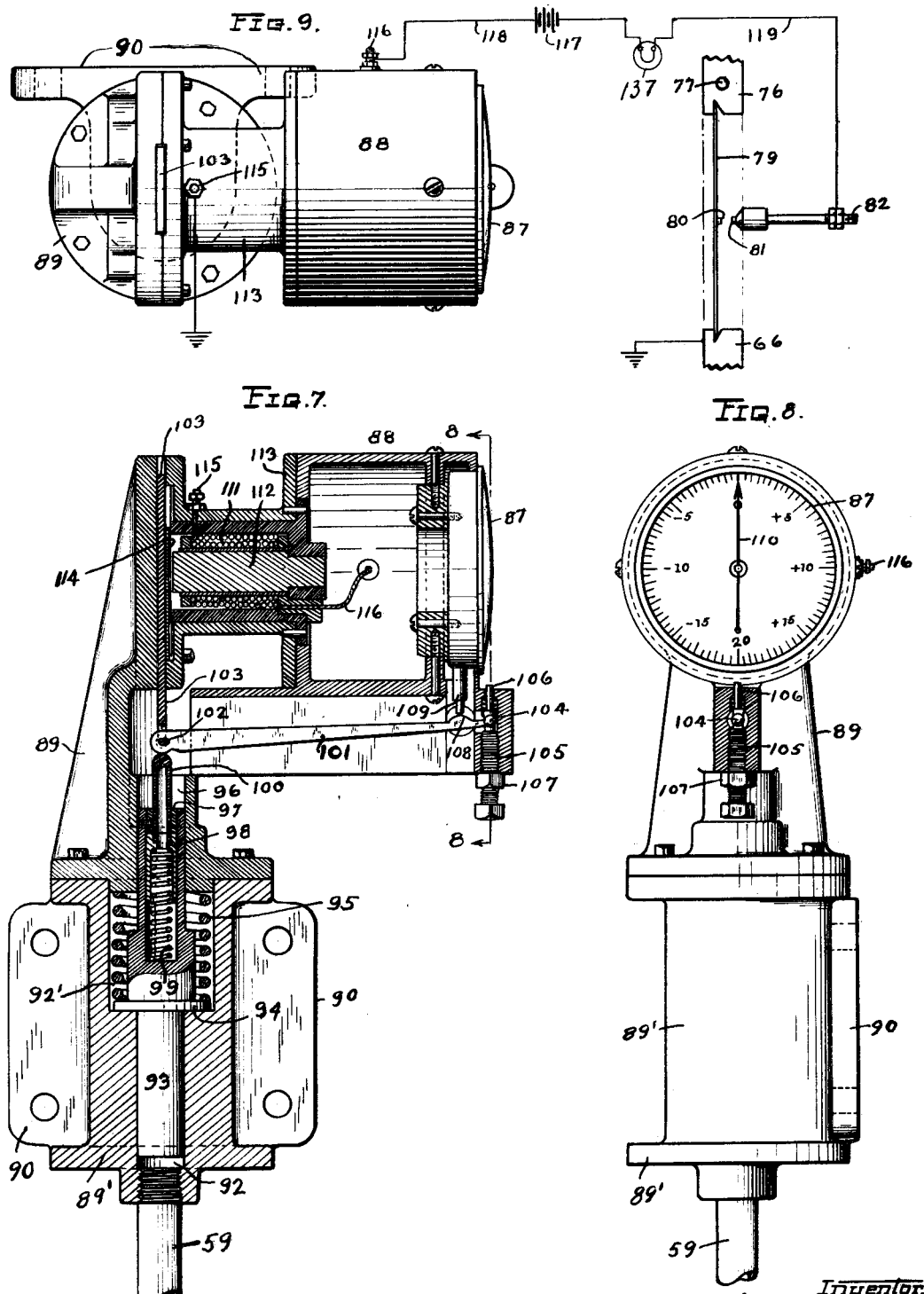

Patented Feb. 11, 1930

1,746,891

UNITED STATES PATENT OFFICE

JOSEPH GOGAN, OF CLEVELAND, OHIO

APPARATUS FOR TESTING MATERIALS

Application filed February 26, 1927. Serial No. 171,419.

This invention relates to improvements in machines for testing the hardness of metal of the type in which a test ball of hardened steel is forced into the metal to be tested, and has reference particularly to machines for giving comparative readings rather than absolute hardness indications.

Heretofore in the use of hardness testing machines it has been common practice to test an occasional piece only of a production run not only because of the considerable amount of time required to prepare the sample for test and to carry out the test but also because in many instances the machining or grinding of a flat surface necessary for the test so damages the piece that it is necessary to discard it.

One of the objects of the present invention is to make possible and practicable the testing for hardness of every piece in production, thus reducing greatly the percentage of unsuitable pieces and the servicing of machines in which they are used.

Another object is to eliminate the necessity for producing a special flat surface in the piece to be tested so that the utility of the pieces tested for their ultimate purpose may not be destroyed.

Another object of the invention is the provision of a machine which will enable the operator to make tests on surfaces other than flat surfaces.

Another object is the provision of a machine which will give a correct indication of the hardness of the internal structure of the piece, that is, an indication which will not be affected by the surface condition of the metal.

Another object is the provision of a machine which will enable the operator to obtain his reading directly from the machine at the time the test ball is forced into the metal, instead of requiring a further operation of measuring the diameter or area of the impression made by the test ball.

Another object is the provision of a machine which will press the test ball into the test piece a predetermined distance, say 10/1000 of an inch, giving at the end of that time a reading which is proportionate to the pressure exerted in so moving the ball, this reading being readily compared with a corresponding reading on a sample known to be of the correct hardness.

Another object is the provision of a machine in which means is provided for increasing the time element for each testing operation whereby the pressing of the ball into the metal proceeds slowly enough not to be affected by the natural resiliency of the metal, in other words, to counteract whatever tendency there might be for the displaced metal to return to its former condition as in the case of a quick blow.

Still another object is the provision of means, preferably including an electric circuit, for instantaneously terminating the movement of the pressure indicator hand when the ball has moved through its predetermined distance.

Other objects will appear as I proceed with the description of that embodiment of the invention which, for the purposes of the present application, I have illustrated in the accompanying drawings, in which:

Fig. 2 is a vertical sectional view, on a larger scale, of the upper part of the machine on a plane substantially bisecting the test ball holder and its plunger.

Fig. 3 is a view in elevation looking in the direction of arrow 3 in Fig. 1.

Fig. 4 is a plan view of the machine.

Fig. 5 is a detail horizontal sectional view on the line 5—5 of Fig. 3.

Fig. 6 is a detail vertical sectional view on the line 6—6 of Fig. 5.

Fig. 7 is a vertical sectional view on a larger scale of the pressure gauge and its operating connections, the view being taken substantially on line 7—7 of Fig. 3.

Fig. 8 is an elevational view, partially in section, on the line 8—8 of Fig. 7.

Fig. 9 is a plan view of the gauge but showing also diagrammatically the electric connections by means of which the gauge hand is locked in the position it occupies when the test ball has completed its predetermined travel.

Like reference characters refer to like parts throughout the views.

Figure 1:
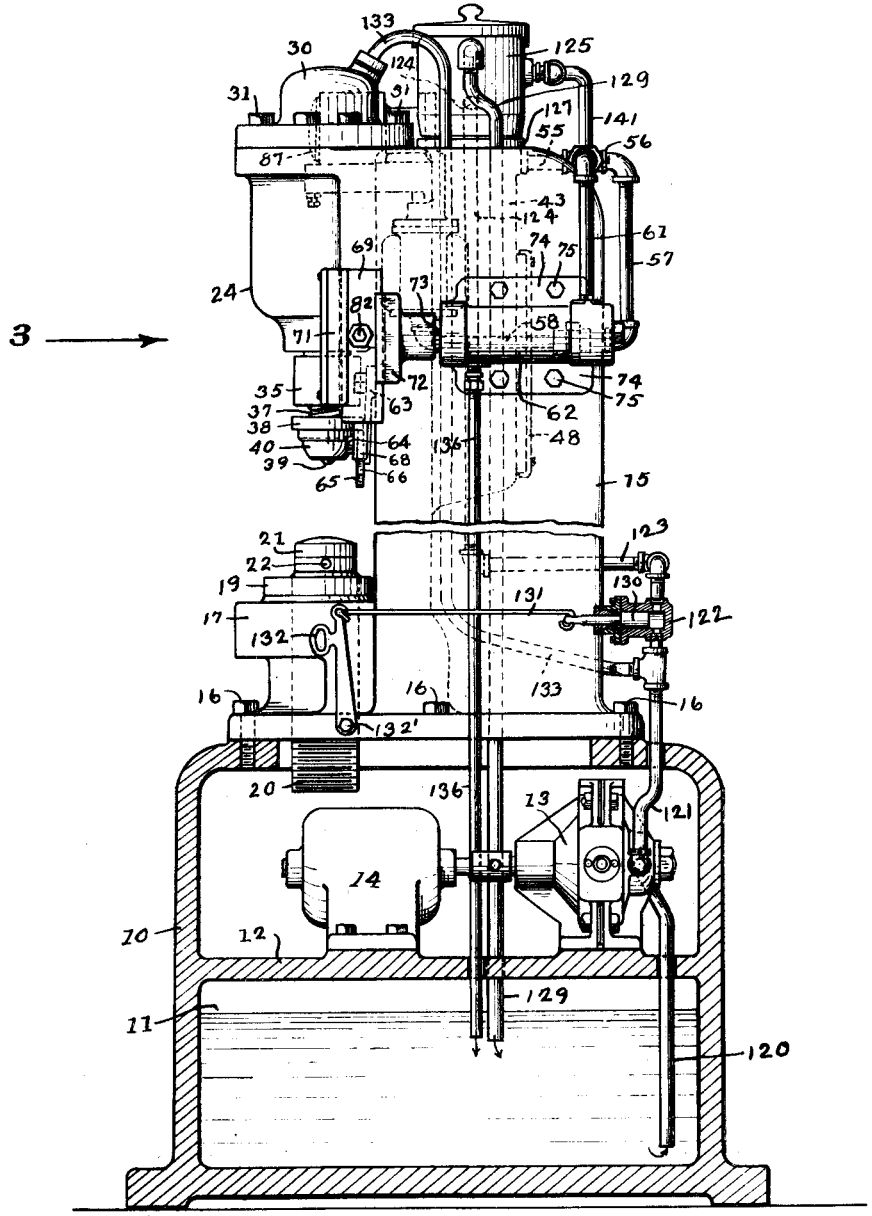
Fig. 1 is a view of my improved machine, principally in side elevation, the base of the machine being shown in vertical section in order to disclose the pressure pump and its driving motor.

In the drawings, the base of the machine is illustrated at 10. It has a lower compartment or sump 11 in which the oil or other liquid employed for transmitting pressure is stored. Within the base 10 there is a floor or framework 12 upon which is supported a positive action liquid pump 13 and a motor 14 for driving the same. A casting 15 which carries the other operating parts of the machine is secured to the top of the base 10 by stud bolts 16 or the like.

The casting 15 has a projection 17 near its lower end through which is formed a vertical hole 18 for the reception of a flanged block 19 which is threaded to receive a post 20 on the upper end of which is carried an anvil 21 for supporting the piece to be tested. This anvil 21 may have its upper surface formed to any desired contour depending upon the shape of the articles to be tested, the anvil being preferably formed with a shank 21′ which is removably held in a bore in the post 20 by means of a pin 22. A lock nut 23 may be employed if desired to maintain the post 20 in any desired position of adjustment.

In vertical alignment with the projection 17 is an upper projection 24 in which is carried a plunger 25 which has relatively small upper and lower ends and a larger intermediate portion. The intermediate portion is mounted to slide in a bore 26 in the projection 24 and the small lower end in a bore 27 in the same projection. The plunger 25 is urged upwardly by a coil spring 28 which bears at its lower end against the bottom of a slight enlargement of the bore 26. The upper end of a spring 28 presses against a ball thrust bearing 9, the lower race of which turns readily in response to any tendency imparted from spring 28 during compression and expansion and thus the unintentional rotation of the plunger from this cause is prevented. The small upper end of the plunger slides in a bore 29 formed in a cap 30, the latter being secured in place upon the casting 15 by stud bolts 31 or the like.

The plunger 25 is provided with an axial bore in which is mounted a two-piece stem comprising the parts 32 and 32′, the latter having a head 34. The head 34 of the part 32′ is located within but does not fill a cavity at the upper end of the bore. The lower edge of the head 34 contacts throughout its periphery, an inclined surface connecting the walls of this cavity with those of the bore, this edge and surface forming a valve and valve seat.

The plunger 25 protrudes through the lower end of the bore 27 and has threaded to it a sleeve 35 with an inwardly extending flange 36. Within the sleeve 35 is located a coil spring 37 which bears at one end on the flange 36 and at the other end on a foot 38 threaded upon the lower extremity of the part 32. The foot 38 is formed of hard metal and constitutes a backing for the hardened steel test ball 39 which is held in its proper position by a ball retainer 40 threaded onto the foot 38. It will be apparent that the spring 37 acts upon the foot 38 to pull downwardly upon the stem part 32, a shoulder 33 forming a stop to limit this motion. The line of division between the stem parts 32, 32′ is at the point marked 8 in Fig. 2. A spring 7 which cooperates with the head 34 tends to press the part 32′ downwardly and thus hold the head or valve 34 seated on the inclined surface above referred to.

In the cap 30 there is an annular groove 41 which is connected by radial passages 42 with the bore for the stem 32, 32′, the latter being of slightly constricted cross section at this point so as to provide an annular vertical passage which is in communication with the area around the upper part of the head 34 when the latter is unseated. The casting 15 contains a vertical cylinder 43 in which is mounted to slide a piston 44 loaded with a spring 45 which is seated in a socket 46 at the lower end of a cavity 47 closed by a plate 48, the spring tending to hold the piston at the upper limit of its motion. Any motive fluid which works its way past the sliding surfaces of the plunger 25 is directed by passages 49 and 50 into cavity 47, and such motive fluid together with that which may work past the piston 44 is carried back to the sump through a delivery pipe 51. The top of the cylinder 43 is connected with the annular passage 41 at the bottom of the cap 30 by a drilled passage 52 and a small passage 53 in the bottom of the cap 30. There is also a drilled passage 54 connecting the cylinder 43 with a pipe 55. The latter opens into a fitting 56 from which pipes 57, 58 and 59 lead to the gauge hereinafter to be described and from which pipes 60 and 61 lead to a cylinder 62, the purpose of which will presently appear.

On the front side of the casting 15 there is secured a bracket 63 upon which is pivotally mounted at 64 a lever 65, the short arm of which engages the lower surface of a shoulder on the foot 38 of the stem 32, while the long arm of the lever engages the lower end of a block 66 which is free to move vertically in a slot 67 formed in a slide 68, the slot being covered on what would otherwise be its open side by a plate or bar 69 which is secured in position by machine screws 70. The slide 68 with its cover bar 69 is mounted to slide vertically in a guideway formed partially in a projection 71 on the casting 15 and partially in a block 72 attached to a plunger 73 which is mounted in the cylinder 62. The cylinder 62 has supporting flanges 74 which are secured to the casting 15 by means of stud bolts 75 or the like.

It may be noted that in Fig. 5 the pipe 61 is shown entering the cylinder 62 at a position revolved 90° from its actual position for the sake of clearness in illustration. When pressure fluid comes into the cylinder 62 through pipe 61, the plunger 73 tends to move outward and thus to move block 72 so as to clamp the slide 68 against the projection 71 of the casting 15.

In the top of the slide 68 is a block 76 which is fixed against movement therein by means of a pin 77. In the opposed ends of the blocks 66 and 76 there are formed notches 78, each notch having one vertical and one inclined side, as illustrated particularly in Fig. 6. A resilient metal plate 79 is mounted with its ends in these notches. Midway between its ends the plate 79 carries an electric contact 80 which faces a contact 81 on the inner end of a binding post 82, this post being mounted in a hollow plug 83 of insulating material, with a spring 84 tending to hold the contact 81 in proper position but capable of relaxing slightly if necessary. The plug 83 fits tightly in a threaded collar 85 which is screwed into a threaded hole in the slide cover 69 by which means the distance between the contacts 80 and 81 may be nicely adjusted. The normal position of the contact 81 may also be adjusted by means of the nuts 82' on the post 82, these nuts acting as stops to limit the inward movement of the binding post by the spring 84. The collar 85 may be held in adjusted position by means of a lock nut 86. Obviously, a small amount of movement of the block 66 toward the block 76 will produce a considerable bowing out of the plate 79 toward the right in Fig. 6, the inclined faces of the notches 78 accommodating movement in that direction. This bowing out of the plate 76 will bring the electric contacts 80 and 81 into engagement.

Now referring to Figs. 7, 8 and 9, a pressure gauge of any suitable character is illustrated at 87, having preferably both minus and plus dial indications. The gauge is mounted in a casing 88 suitably designed to fit it, which casing is secured to a casting 113 on bracket 89 which in turn is secured to the top of a cylinder 89' having side flanges 90 provided with holes for the reception of stud bolts 91 by means of which the gauge and its related parts are mounted upon the casting 15. The pipe 59 is threaded into the bottom of cylinder 89' and communicates with the bore 92 therein, in which is mounted to slide a plunger 93. Above the bore 92 the cylinder 89' is provided with a cavity 92' in which is located an enlargement of the plunger having a flange 94 which is pressed downward against the bottom of the cavity 92' by a spring 95, the upper end of which bears against a boss on the bottom of the bracket 89 that fits within the cavity referred to. The upper end of the plunger 93 slides within a guide bore 96 in the bracket 89 and is hollow, as shown in Fig. 7. The upper end of the plunger 93 is partially closed by a ring or collar 97 suitably secured to the plunger and forming a stop for slide 98 which is urged upwardly by a spring 99. The slide 98 has an upward extension or stem 100 of a diameter small enough to slide within the ring 97. The stem 100 bears against one end of a lever 101 which is pivoted at 102 to a soft iron armature or plate 103 mounted to slide in a slot in the bracket 89. The lever 101 has a ball 104 at its outer end which is mounted for pivotal movement in a socket formed partially in the upper end of a threaded post 105 and partially in the lower end of a spring pressed pin 106, adjustment being possible by screwing the post 105 into or out of its threaded hole and locking it in position by means of a lock nut 107. A hump 108 on the lever near the fulcrum point, which is at the center of ball 104, serves to lift a vertically reciprocable rod 109 which extends into the gauge 87 and is operatively connected by means (not shown) with an indicator hand 110 in such manner that as the rod 109 is moved the hand 110 turns in accordance with movements of the lever 101.

An electromagnet 111 with soft iron core 112 is mounted within the small spool-shaped casting 113 in such manner that one end of the core 112 is but a short distance from armature 103 although separated therefrom by a plate 114 of non-magnetic material. One terminal 115 of the magnet is grounded while the other terminal 116 is connected through a suitable source of current 117 by a conductor 118, 119, to binding post 82. Block 66 being also connected to the ground, it will be obvious that when contact 80 engages contact 81 current will flow through electromagnet 111 causing magnetic lines of force to penetrate armature 103, attracting the same sufficiently to prevent sliding movement of the armature in its slot, whereby the stem 100 will be stopped and further movement of the plunger 93 will merely compress the spring 99.

The intake for the pump 13 from the sump 11 is through pipe 120 and the exit from the pump is through pipe 121. Normally, the flow of oil or other motive fluid is through valve casing 122 and pipes 123 and 124 upwardly into oil strainer 125 below the wire mesh 140 therein, said strainer being supported upon a short post 126 threaded at both ends, the lower end of the post being mounted in a plate or cap 127 which covers the cylinder 43 and is fastened in place by stud bolts 128. The flow out of the strainer is from the space above wire mesh 140 out through pipe 129 and back to the sump. A pipe 141 with a check valve 142 opening in the direction of arrow 143 leads from the strainer above wire mesh 140 down to union 56, and serves to keep the pipe system filled with oil and prevent any vacuum therein. In the valve casing 122 is a piston valve 130 connected by a rod 131 to an operating lever 132 pivoted at 132' to swing on the casing. When the piston 130 is moved to the right to interrupt flow from pipe 121 to pipe 123, motive fluid is forced to flow upwardly through pipe 133 and drilled passage 134 into cavity 135 above the plunger 25, whereby the plunger is actuated to press the ball 39 into the test piece. When a test is completed, the operator withdraws valve 130 to the position shown in Fig. 1, whereupon the pressure above plunger 25 and in the various cylinders and pipes and passages connected therewith dissipates itself through passage 134 and pipe 133 and upwardly through valve chamber 122 and pipes 123 and 124 into the strainer 125 and thence out through pipe 129 and down to the sump. Pipe 136 is a drain for motive fluid finding its way along the walls of the cylinder 62.

Operation: The anvil post 20 is first adjusted so that when the test piece T is placed upon the anvil the ball 39 will be immediately thereabove. Then the operator pushes the control handle 132 to the right, as viewed in Fig. 1, closing the valve 130. Now assuming that the motor 14 is running and the pump 13 is operating, in consequence, oil or other liquid will be pumped from the sump 11 upwardly through pipes 120, 121 and 133 and passage 134 into the cavity 135 above the plunger 25. Then as soon as the pressure in cavity 135 builds up sufficiently, the plunger 25 and the two-piece stem 32 begin to move downwardly together, overcoming the spring 28 in so doing. The descent of the large portion of the plunger in its bore 26 tends to form a vacuum in space 41 but this tendency is opposed by the flow of oil from the upper part of strainer 125 down through pipe 141 and check valve 140 into union 56 and thence through pipe 55, passage 54, cylinder 43 and passages 52 and 53 into the bore 26. Spring 37, which is relatively strong, acts upon the foot 38 to hold the same spaced from sleeve 35, and the ball 39 is thereby pressed through the outer surface of the metal of the test piece, including whatever scale, dirt or other foreign material may be present, and to a certain extent into the homogeneous internal structure of the metal, the extent of this preliminary action being dependent upon the strength of spring 37 which in practice I prefer to make of a capacity such that it will absorb about 2,000 lbs. pressure exerted upon the annular surface at the top of the plunger before being compressed. During this preliminary movement of the plunger 25, the lever 65 (Fig. 3) is of course rocked upon its pivot 64 and the block 66 is pushed upwardly. This upward pressure on the block 66 is transmitted through resilient plate 79 to block 76 and thus to the slide 68 with its cover bar 69, and the latter parts, being free to move in their guideways and being of a mass too small to deflect plate 79 are all moved freely upward.

When the predetermined preliminary pressure, 2,000 lbs. for example, is exceeded, the stem 32 being held stationary by the test piece, the plunger 25 moves sufficiently to unseat the valve piece or head 34 and pressure liquid flows down around the valve and through radial passages 42, annular passage 41, and passages 53 and 52 into the cylinder 43, then through passage 54 and pipe 55 to union 56, and through pipes 57, 58 and 59 to cylinder 92 of the gauge operating mechanism and from union 56 through pipes 60 and 61 to cylinder 62 of the slide clamping mechanism. Its flow upwardly from union 56 through pipe 141 is prevented, however, by check valve 142.

Motion of the plunger 25 now momentarily ceases until the pressure in the three cylinders and in the pipes and connections leading thereto builds up. Piston 44 is moved downwardly against the load of spring 45, increasing the space to be filled with pressure liquid, thus acting as an accumulator. The plunger 93 tends to move upwardly gradually against its spring 95 while plunger 73 moves immediately the very slight amount necessary to cause slide 68 to be gripped between the projection 71 and the block 72. In practice, I prefer to make the spring 95 heavy enough to prevent any appreciable movement of plunger 93 until near the end of the ball travel.

Plunger 93 in moving upwardly against the tension of spring 95 raises slide 98 and stem 100 through spring 99, thereby rocking lever 101 about its fulcrum 104 and causing hump 108 to lift rod 109 and move hand 110 of the gauge 87.

When the 2,000 lbs. starting pressure is reached throughout the operative parts of the machine mentioned, plunger 25 again begins its movement downward, bringing the sleeve 35 into engagement with the foot 38, and the measuring portion of the test operation is thus begun. Lever 101 continues to move in response to increased pressure exerted on the plunger 92. Slide 68 and block 76 (Fig. 6) being now held against movement and lever 65 again resuming its upward pressure on block 66, the resilient plate 79 is forced to bend toward the right, this bending or bowing movement advancing the contact point 80 much more rapidly than the block 66 moves, which fact is of great advantage in enabling a comparatively coarse setting or adjustment of the points 80 and 81, and thereby reducing unavoidable errors in proportion to the ratio between the test ball travel and the travel of contact point 80.

At the time the slide 68 is locked against movement, the test ball 39 occupies a certain position in the piece of metal being tested. The contact points 80 and 81 are so spaced that at the instant the test ball reaches a new position a certain predetermined distance further into the metal, for example 10/1000 of an inch, the contact points will touch and a current of electricity will thereupon flow from storage battery or other source 117 through wire 118 and electromagnet 111, ground, contacts 80 and 81, binding post 82 and wire 119, back to battery. Instantaneously, therefore, the electromagnet 111 will be energized and the armature 103 will be locked against movement, thereby preventing further movement of the lever 101 in either direction. The operator is then apprised of the completion of the test either by the fact that the hand 110 has stopped moving, or, if preferred, by the actuation of some audible or visible signal such, for instance, as an electric lamp 137, Fig. 9. He thereupon takes his reading from the gauge without haste, the continued operation of the machine doing no harm whatever as further pressure on the cylinder 92 merely brings about the compression of spring 99. As a further precaution against too great an accumulation of pressure in the machine, I prefer to employ a pump so designed that it can increase the pressure only up to a certain predetermined limit, such pumps being well known in the art. The gauge reading having been noted, the operator then pulls the handle 132 to again open the valve 130, whereupon the pressure in the system dissipates itself as hereinbefore explained, after which the spring 7 again seats the valve in the plunger, the spring 28 returns the plunger to its normal position, and the spring 37 pulls down the lower section of stem 32 until stopped by the shoulder 33. The motor 14 runs continuously during a series of tests, the pump 13 normally circulating oil through pipes 123, 124, strainer 125, and pipe 129, back to the sump without doing work.

In practice, one or more pieces of a form for which it is desired to use the machine are found to be of a satisfactory hardness through tests in the laboratory conducted with apparatus giving absolute hardness indications. These pieces are then subjected to the operation of this machine and the readings of the machine noted. In this manner the reading for the ideal hardness of the article in question is determined and the dial of the pressure gauge is rotated so as to give a zero indication for this ideal hardness. In the use of the machine thereafter, any piece of metal coming near that ideal or within a certain plus or minus variation, is regarded as satisfactory. Thus it will be observed that comparative tests upon pieces of a given character may be quickly conducted without the necessity of machining a flat or otherwise specially prepared surface, and with no effect upon the test piece other than a small depression made by the test ball.

I have herein referred to the element for making the depression in the test piece as a ball and to the support therefor as a ball holder, but obviously any other shape which may be found desirable could be employed instead and I therefore desire it to be understood that the term "ball" is to be construed as including all suitable depression forming elements.

Having thus described my invention, I claim:

1. In a hardness tester, a test ball holder, means for advancing the holder with the ball against the test piece to penetrate the outer crust of the test piece and force the ball into the homogeneous internal structure of the latter, means for continuing the advance of the holder from that point on through a predetermined distance, and means for measuring the pressure exerted during said continued advance.

2. In a hardness tester, a test ball holder, means for advancing the holder with the ball against the test piece until a certain preliminary pressure has been exerted, means for continuing the advance of the holder from that point on through a predetermined distance, and means for measuring the pressure exerted subsequent to said preliminary pressure.

3. In a hardness tester, a test ball holder, means for advancing the holder with the ball against the test piece until a certain preliminary pressure has been exerted, means for measuring pressure in excess of said preliminary pressure, and means for increasing the pressure above said preliminary pressure until said holder has advanced a predetermined distance beyond its position at the time of the completion of said preliminary pressure.

4. In a hardness tester, a test ball holder, means for advancing the holder with the ball against the test piece until a certain preliminary pressure has been exerted, means for measuring pressure in excess of said preliminary pressure, means for increasing the pressure above said preliminary pressure until said holder has advanced a predetermined distance beyond its position at the end of said preliminary pressure, and means for discontinuing the action of said measuring means immediately upon the completion of the travel of said holder through its predetermined distance.

5. In a hardness tester, a test ball holder embodying a plunger, a cylinder therefor, means for controlling test ball travel, means actuated by fluid pressure for setting said controlling means, and means for opening up communication between said cylinder and said setting means after a certain preliminary pressure has been exerted in said cylinder against said plunger.

6. In a hardness tester, a test ball holder embodying a plunger, a cylinder therefor, means for controlling ball travel adapted to be set by fluid pressure, said cylinder having an intake port for pressure fluid and an exit port spaced from said intake port and connected to said controlling means, and means for bringing said ports into communication as the pressure in the cylinder reaches a certain predetermined value.

7. In a hardness tester, a test ball holder embodying a plunger, a cylinder therefor, means for controlling ball travel adapted to be set by fluid pressure, said cylinder having an intake port for pressure fluid and an exit port spaced from said intake port and connected to said controlling means, a preliminary movement of said plunger being adapted to bring said ports into communication with each other.

8. In a hardness tester, a test ball holder embodying a plunger, a cylinder therefor, means for controlling test ball travel, means for setting said controlling means, and means for opening up communication between said cylinder and said setting means embodying a spring adapted to be compressed upon the exertion of a certain preliminary pressure in said cylinder.

9. In a hardness tester, a test ball holder embodying a plunger having two relatively movable parts, a spring interposed between said parts, a cylinder for the plunger, means for controlling ball travel adapted to be set by fluid pressure, said means having a conduit connected with said cylinder, said cylinder having a pressure intake port and a passage for connecting said port and conduit which is opened when relative motion between said plunger parts occurs.

10. In a hardness tester, a test ball holder embodying a plunger having two relatively movable concentric sliding parts, a spring tending to hold said parts against relative motion, a cylinder in which the plunger slides, means for controlling ball travel adapted to be set by fluid pressure, said means having a conduit connected with said cylinder, said cylinder having an intake port, said plunger having a passage for connecting said port and conduit, and a valve for controlling the same, relative motion between said plunger parts opposed to the action of said spring serving to open said valve.

11. In a hardness tester, a test ball holder embodying a plunger, a cylinder therefor having a pressure fluid intake port, a second cylinder adapted to be brought into communication with said first named cylinder, and a loaded piston for said second cylinder, whereby the time factor for the movement of said plunger subsequent to the establishment of such communication is increased.

12. In a hardness tester, a test ball holder embodying a plunger, a cylinder therefor, a pressure indicator, a second cylinder in communication with said first named cylinder, a loaded piston therefor, and means for opening communication between said second cylinder, said first named cylinder and said indicator after a certain preliminary pressure has been exerted against said plunger.

13. In a hardness tester, a plunger, a test ball carried thereby, a pressure gauge, operating connections therefor, driving means for actuating said plunger and connections proportioately, means for locking said connections against movement, and means actuated upon the completion of a predetermined test ball movement for operating said locking means.

14. In a hardness tester, a plunger, a test ball carried thereby, a pressure gauge, operating means therefor arranged to be actuated by the pressure on the plunger, electromagnetic means for locking said operating means against movement, an electric circuit including said electromagnetic means, and a switch for said circuit arranged to be actuated at the completion of a predetermined test ball movement.

15. In a hardness tester, a plunger, a test ball carried thereby, a pressure gauge, operating means therefor arranged to be actuated by the pressure on the plunger, electromagnetic means for locking said operating means against movement, an electric circuit including said electromagnetic means, and a switch for said circuit with contacts spaced apart a substantial distance in inoperative position, said switch being connected to the plunger to be closed by a comparatively short movement of the latter.

16. In a hardness tester, a plunger, a test ball carried thereby, a pressure gauge for measuring the pressure on said ball carrying plunger, operating connections for said gauge, driving means for actuating said plunger and connections proportionately, an electromagnet, an armature therefor movable across the field of said magnet to an extent proportionate to the movement of said connections, and means actuated upon the completion of a predetermined test ball movement for energizing said magnet.

17. In a hardness tester, a plunger, a test ball carried thereby, a pressure gauge for measuring the pressure on said ball carrying plunger, operating connections for said gauge, driving means for actuating said plunger and connections proportionately, an electromagnet, an armature therefor movable across the field of said magnet to an extent proportionate to the movement of said connections, an electric circuit for said electromagnet, a switch in said circuit with contacts spaced apart a substantial distance in the inoperative position, said switch being connected to the plunger to be closed by a comparatively short movement of the latter.

18. In a hardness tester, a movable test ball, a pressure gauge, operative connections therefor, a plunger adapted to move said connections, driving means for actuating said test ball and plunger proportionately, means for locking said connections against movement, and resilient means permitting an overrunning movement of said plunger.

19. In a hardness tester, a test ball holder, means for moving said holder to press the ball into the test piece, a slide connected to be moved simultaneously with the ball holder and to a proportionate extent, means for locking said slide against movement, and means within the slide for making an electric contact, said means being actuated by the further movement of the ball holder through a predetermined distance.

20. In a hardness tester, a test ball holder, pressure fluid means for moving said holder to press the ball into the test piece, a pair of longitudinally movable blocks separated by a resilient element, an operative connection between said holder and one of said blocks to move the latter proportionately to the movement of the holder, means for locking the other block against movement, a pressure gauge for said pressure fluid, and means controlled by the movement of the first named block through a predetermined distance relative to the second block for indicating the measured pressure exerted against the plunger at the time the movement through the said predetermined distance is completed.

21. In a hardness tester, a test ball holder, pressure fluid means for moving said holder to press the ball into the test piece, a pair of longitudinally movable blocks separated by a resilent element, an operative connection between said holder and one of said blocks to move the latter proportionately to the movement of the holder, means for locking the other block against movement, a pressure gauge for said pressure fluid, electromagnetic means for locking said gauge against movement, an electric circuit for said magnet, a switch in said circuit, and means actuated by the movement of the first named block through a predetermined distance relative to the second block for closing said switch.

22. In a hardness tester, a test ball, a pressure gauge, pressure means for actuating said test ball, and gauge proportionately, means for measuring the pressure exerted during a predetermined test ball travel, comprising a resilient metal plate, means actuated in proportion to the test ball travel for producing relative motion between the ends of the plate to bow out the same, and electric means energized at the instant of the completion of a predetermined bowing movement for indicating on said gauge the pressure exerted by said ball at that instant.

23. In a hardness tester, a plunger, a test ball carried thereby, a pressure gauge, driving means for actuating said plunger and gauge proportionately, means for locking the indicating mechanism of said gauge, and means actuated upon the completion of a predetermined test ball movement for operating said locking means.

24. In a hardness tester, means for making a preliminary impression in the test piece, means for deepening said impression, a single control for setting said two means in operation consecutively and means for measuring the pressure exerted in deepening the impression a certain predetermined amount.

In testimony whereof, I hereunto affix my signature.

JOSEPH GOGAN.